(12) United States Patent
Carey et al.

(10) Patent No.: US 10,254,940 B2
(45) Date of Patent: Apr. 9, 2019

(54) MODIFYING DEVICE CONTENT TO FACILITATE USER INTERACTION

(71) Applicant: International Business Machines Corporation, Armonk, NY (US)

(72) Inventors: James E. Carey, Rochester, MN (US); Jim C. Chen, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 15/491,550

(22) Filed: Apr. 19, 2017

(65) Prior Publication Data

US 2018/0307401 A1 Oct. 25, 2018

(51) Int. Cl.
| | |
|---|---|
| *G06F 3/01* | (2006.01) |
| *G06F 3/0484* | (2013.01) |
| *G06F 3/0346* | (2013.01) |
| *G06F 3/0488* | (2013.01) |
| *G06F 3/0482* | (2013.01) |

(52) U.S. Cl.
CPC .......... *G06F 3/04845* (2013.01); *G06F 3/017* (2013.01); *G06F 3/0346* (2013.01); *G06F 3/04883* (2013.01); *G06F 3/0482* (2013.01)

(58) Field of Classification Search
CPC combination set(s) only.
See application file for complete search history.

(56) References Cited

U.S. PATENT DOCUMENTS

| | | | |
|---|---|---|---|
| 9,268,407 B1 * | 2/2016 | Noble | G06F 3/0488 |
| 9,405,391 B1 | 8/2016 | Mackraz | |
| 9,658,716 B2 * | 5/2017 | Ma | G06F 3/0418 |
| 2011/0298830 A1 | 12/2011 | Lam | |
| 2013/0237288 A1 * | 9/2013 | Lee | G06F 3/041 455/566 |
| 2013/0300668 A1 * | 11/2013 | Churikov | G06F 3/041 345/168 |
| 2014/0137036 A1 | 5/2014 | Han | |
| 2014/0215336 A1 * | 7/2014 | Gardenfors | G06F 3/017 715/719 |
| 2014/0289642 A1 | 9/2014 | Prasad | |

(Continued)

OTHER PUBLICATIONS ip.com et al., "Method of automatically identifying left/right hand use and thumb reaching area to adjust the layout on mobile device", IPCOM000244441D, Dec. 13, 2015, 7 pages.

ip.com et al.; "Method to control the un-touchable area of mobile phone with large screen," IPCOM000232531D, Nov. 15, 2013, 7 pages.

Lai, J. et al.; "ExtendedThumb: A Target Acquisition Approach for One-Handed Interaction With Touch-Screen Mobile Phones", IEEE Transactions on Human-Machine Systems, vol. 45, No. 3, Jun. 2015, pp. 362-370.

(Continued)

*Primary Examiner* — Hien L Duong
(74) *Attorney, Agent, or Firm* — Patterson + Sheridan, LLP

(57) ABSTRACT

Systems, methods, and computer program products to perform an operation comprising dynamically selecting a first user hand position profile, where in the first user hand position profile includes a first range of reach of a digit of a first hand of the user while the user is holding the mobile device with the first hand in a first position, performing a first predefined operation to modify a first object, wherein modifying the first object causes the first object to be outputted at a location on a touchscreen display within the range of reach of the digit of the first hand, and outputting the modified first object on the touchscreen display.

17 Claims, 6 Drawing Sheets

(56) References Cited

U.S. PATENT DOCUMENTS

| | | | |
|---|---|---|---|
| 2014/0320434 A1* | 10/2014 | Pantel | G06F 3/017 345/173 |
| 2014/0362119 A1 | 12/2014 | Freund et al. | |
| 2014/0380209 A1 | 12/2014 | Tsukamoto | |
| 2015/0046825 A1 | 2/2015 | Li | |
| 2015/0089360 A1* | 3/2015 | Brisebois | G06F 3/04817 715/702 |
| 2015/0089386 A1* | 3/2015 | Brisebois | G06F 3/0488 715/746 |
| 2015/0177826 A1* | 6/2015 | Aizawa | G06F 3/01 345/173 |
| 2015/0234581 A1 | 8/2015 | Terrero et al. | |
| 2016/0034131 A1* | 2/2016 | Kosaka | G06F 3/0488 715/765 |
| 2016/0070466 A1 | 3/2016 | Chaudhri et al. | |
| 2016/0124624 A1 | 5/2016 | Chen | |
| 2016/0162150 A1 | 6/2016 | Patel et al. | |
| 2016/0246499 A1 | 8/2016 | Kulas | |
| 2016/0349985 A1* | 12/2016 | Ibaraki | G06F 3/04883 |
| 2017/0097751 A1* | 4/2017 | Lee | G06F 3/04812 |
| 2017/0264818 A1* | 9/2017 | Liao | G06F 3/04817 |

OTHER PUBLICATIONS

Xu, W. et al., "RegionalSliding: Facilitating small target selection with marking menu for one-handed thumb use on touchscreen-based mobile devices," Pervasive and Mobile Computing, vol. 17, Part A, Feb. 2015, pp. 63-78.

Kahn, J., "A Look at Apple's 'Reachability' one-hand mode for larger iPhone 6 (Video)," Sep. 9, 2014 (Accessed on Apr. 12, 2017) <https://9to5mac.com/2014/09/09/a-look-at-apples-reachability-one-hand-mode-for-larger-iphone-6-video/>.

Starr, M., "Ingenious giant phone case makes one-hand usage a snap," Mar. 22, 2015 (Accessed on Apr. 12, 2017) (https://www.cnet.com/news/ingenious-giant-phone-case-makes-one-hand-usage-a-snap/>.

Hoober, S., "How Do Users Really Hold Mobile Devices?" Feb. 18, 2013 (Accessed on Apr. 12, 2017) <http://www.uxmatters.com/mt/archives/2013/02/how-do-users-really-hold-mobile-devices.php>.

Karlson, K. et al., "ThumbSpace: Generalized One-Handed Input for Touchscreen-Based Mobile Devices", Mar. 2007, 15 pages. <http://hcil2.cs.umd.edu/trs/2007-Mar/2007-03.pdf>.

* cited by examiner

US 10,254,940 B2

MODIFYING DEVICE CONTENT TO FACILITATE USER INTERACTION

BACKGROUND

The present invention relates to mobile devices, and more specifically, to modifying content displayed on mobile devices to facilitate user interaction with the mobile device.

Mobile devices are often too large to use with one hand. For example, a user's thumb may not extend far enough to reach all areas of a touchscreen display of the mobile device. Therefore, the user often cannot access objects that are displayed beyond the reach of their thumb with a single hand. In response, users often use both hands to use a mobile device, which is less convenient and more cumbersome than using a single hand when interacting with a mobile device.

SUMMARY

In one embodiment, a method comprises dynamically selecting a first user hand position profile, where in the first user hand position profile includes a first range of reach of a digit of a first hand of the user while the user is holding the mobile device with the first hand in a first position, performing a first predefined operation to modify a first object, wherein modifying the first object causes the first object to be outputted at a location on a touchscreen display within the range of reach of the digit of the first hand, and outputting the modified first object on the touchscreen display.

In another embodiment, a mobile device comprises a processor, a touchscreen display, and a memory storing instructions, which when executed by the processor, performs an operation comprising dynamically selecting a first user hand position profile, where in the first user hand position profile includes a first range of reach of a digit of a first hand of the user while the user is holding the mobile device with the first hand in a first position, performing a first predefined operation to modify a first object, wherein modifying the first object causes the first object to be outputted at a location on a touchscreen display within the range of reach of the digit of the first hand, and outputting the modified first object on the touchscreen display.

In another embodiment, a computer-readable storage medium has computer-readable program code embodied therewith, the computer-readable program code executable by a processor to perform an operation comprising dynamically selecting a first user hand position profile, where in the first user hand position profile includes a first range of reach of a digit of a first hand of the user while the user is holding the mobile device with the first hand in a first position, performing a first predefined operation to modify a first object, wherein modifying the first object causes the first object to be outputted at a location on a touchscreen display within the range of reach of the digit of the first hand, and outputting the modified first object on the touchscreen display.

DETAILED DESCRIPTION

Embodiments disclosed herein dynamically modify content displayed on a touchscreen device to allow users to interact with the device using one hand. For example, if an object is outputted on the top left corner of a touchscreen display, embodiments disclosed herein may enlarge the object, bringing the object within the reach of the user's thumb (or other digits), allowing the user to select the object with the same hand that is holding the device. Additionally, embodiments disclosed herein create a user profile to determine, for a given user, the reach of the user, and user actions (e.g., using a second hand to select an object on the touchscreen) that may signal that the user cannot reach an object on the touchscreen display. Doing so allows the device to leverage information in the user profile to determine that a given object may be out of the span of the user's reach, and that content should be modified on the touchscreen display to help the user reach the object with one hand. Similarly, if the device identifies subsequent user actions that indicate the user cannot reach an object, the device may modify content on the touchscreen display to allow the user to reach the object with one hand, and without having to complete the user action. Additionally, embodiments disclosed herein may identify formatting patterns that indicate the user may not be able to reach an object, and modify the object to allow the user to select the object with one hand. For example, two websites may have similar formats and/or layouts, and the user is known to need assistance reaching an object (e.g., a weather widget) on the first website. When the user subsequently visits the second website, embodiments disclosed herein may identify the similar formats and/or layouts (e.g., a stock widget located in the same location as the weather widget of the first website), and dynamically modify the second website to allow the user to reach the stock widget with one hand.

Figure 1B:
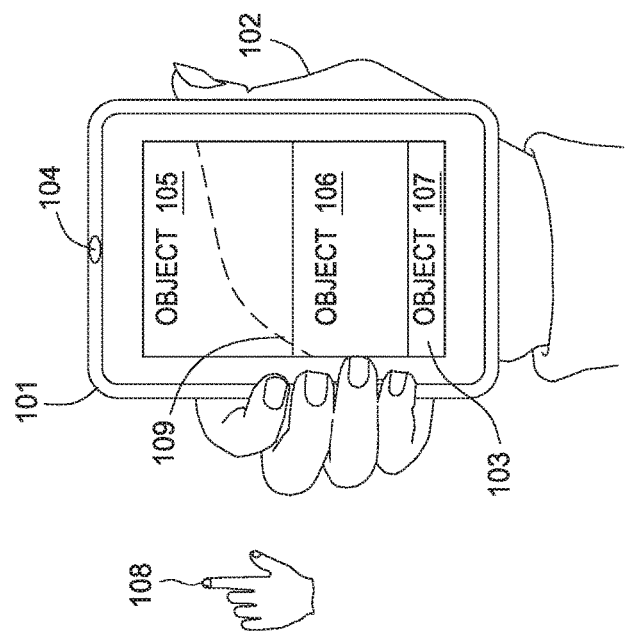
FIGS. 1A-1D illustrate example techniques to modify device content to facilitate user interaction, according to various embodiments.
Figure 1A:
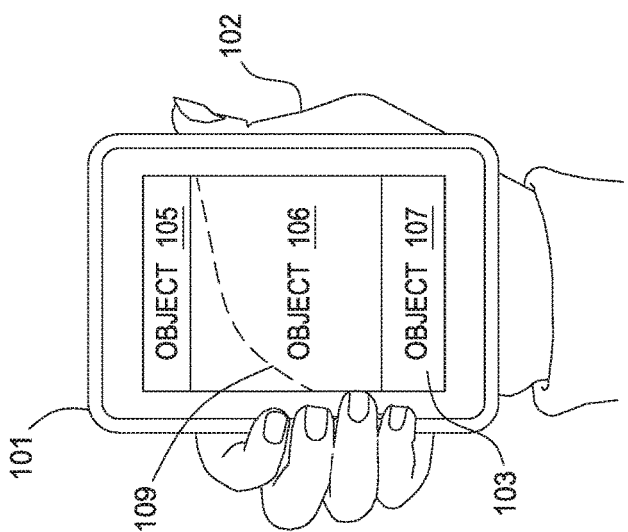

FIG. 1A illustrates an example mobile device 101 which modifies content to facilitate user interaction, according to one embodiment. As shown, the mobile device 101 includes a touchscreen display 103. While the example mobile device 101 in FIGS. 1A-1D is depicted as a smartphone, the mobile device 101 may be any type of hand-held computing device including a touchscreen display, such as a portable gaming console, tablet computer, personal data assistant, and the like. As shown, a user's hand 102 is holding the mobile device 101. In many cases, the thumb (or other digit) of user's hand 102 may not be able to reach all portions of the touchscreen display 103. The range of the user's reach using their thumb (or other digit of the hand 102 holding the mobile device 101) is indicated via a reach line 109 on the touchscreen display. Generally, the user is able to reach areas below the reach line 109 with a digit of the hand 102 holding the mobile device 101, but unable to reach areas above the reach line 109 with a digit of the hand 102. Generally, the mobile device 101 may learn the range of the user's reach using a single hand over time, and store an indication of the reach line 109 in a user profile (not pictured) for the user.

Doing so allows the mobile device 101 to determine whether the user can reach an object outputted on the touchscreen display 103 with one hand.

As shown, the touchscreen display 103 outputs three example objects 105-107. The objects 105-107 may be any graphical element outputted on the touchscreen display, including, without limitation, a button, link, application element, menu, text box, image, widget, icon, and the like. As shown, the objects 106, 107 are within the range of the user's reach, as the objects 106, 107 are below the reach line 109. However, the object 105 is above the reach line 109, and therefore out of the range of the user's thumb. Because the object 105 is outside of the reach of the user's thumb, the user would have to take additional action to access the object 105. For example, the user may use their second hand to select the object 105. As another example, the user may use their second hand to move the mobile device 101 upward or downward in the hand 102 that is currently holding the device, thereby bringing the object 105 within the reach of the user's thumb of the hand 102. As yet another example, the user may switch the mobile device 101 from one hand to the other, and use the hand that was previously holding the mobile device 101 to select the object 105.

FIG. 1B depicts an embodiment where the mobile device 101 has modified the objects 105-107 to facilitate one-handed user interaction with the mobile device 101. As shown, the object 105 has been enlarged, while the objects 106, 107 have been reduced in size to accommodate the increased size of object 105. As shown, the enlarged object 105 now in a different location and extends within the range line 109 of the user, meaning that the user can now select the enlarged object 105 with the thumb of the hand 102 that is holding the mobile device 101.

In at least one embodiment, the mobile device 101 modifies the objects 105-107 based on a determination that the object 105 is outside of the range of the user's reach as defined by the reach line 109. However, in some embodiments, the mobile device 101 may use alternate and/or additional cues to dynamically modify the objects 105-107 to facilitate one-handed interaction with the mobile device 101. For example, as shown, the mobile device 101 includes a camera 104. The mobile device 101 may analyze image data provided by the camera 104 to detect the user's second hand 108 in proximity of the mobile device 101. By detecting the second hand 108, the mobile device may determine that the user is unable to access an object (e.g., the object 105) with the hand 102 holding the mobile device 101, and modify the objects 105-107 to enlarge the object 105, ensuring all objects 105-107 are accessible via the hand 102 holding the mobile device 101. In some embodiments, a user may define a motion which triggers modification of the contents of the touchscreen display 103. For example, the user may define a waving motion made by the hand, which, when subsequently detected by the camera 104, triggers modification of the objects 105-107.

As another example, an accelerometer (not pictured) of the mobile device 101 may detect movement of the mobile device 101. For example, data provided by the accelerometer may reflect that the user is moving the mobile device 101 from the hand 102 to the hand 108, thereby entering a two-handed interaction mode. However, to facilitate one-handed interaction, the mobile device 101 may modify the objects 105-107 to enlarge the object 105, allowing the user to select the object 105 with a single hand (e.g., the hand 102). As another example, the accelerometer may provide data indicating that the user is moving the mobile device 101 up or down in the hand 102. In response, the mobile device 101 may modify the objects 105-107 to facilitate one-handed interaction with the mobile device 101. For example, if the accelerometer data indicates the mobile device is being moved up in the user's hand, the object 107 at the bottom of the touchscreen may be enlarged to help the user select the object 107. As another example, if the accelerometer data indicates the mobile device is being moved down in the user's hand, the object 105 at the top of the touchscreen 103 may be enlarged to help the user select the object 105.

Furthermore, the mobile device 101 may analyze the objects 105-107 to determine whether the layout of the objects 105-107 is similar to that of other objects that the user has previously been unable to access with a single hand. For example, the user's profile may include an indication of objects that the corresponding user cannot reach with one hand. The mobile device 101 may then compare the objects 105-107 to these objects in the profile. If the mobile device 101 determines that the layout of the objects 105-107 is similar to the objects in the profile, the mobile device 101 may modify the objects 105-107 to facilitate one-handed interaction with the mobile device 101. For example, if object 105 is determined to match object X in the user profile, the mobile device 101 may apply an action to object 105 (and/or objects 106-107). For example, the mobile device 101 may enlarge object 105 and reduce the size of objects 106-107.

Figure 1D:
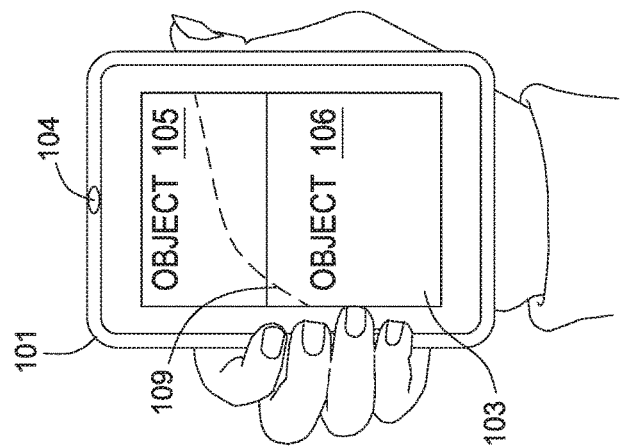
Figure 1C:
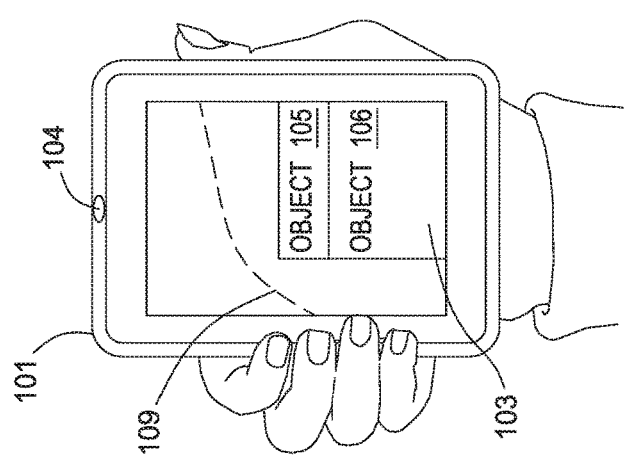

FIG. 1C depicts an example embodiment where the contents of the touchscreen display 103 (e.g., the objects 105-107) are shifted on the touchscreen display 103. As shown, the touchscreen display 103 now outputs a portion of the objects 105, 106, while not outputting the object 107, as the entire content of the display 103 has been shifted down and to the right, bringing the object 105 within the reach line 109 of the user. Again, the mobile device 101 may shift the contents of the touchscreen display 103 based on any number of factors, such as detecting a user action (e.g., identifying the hand 108 via the camera 104, detecting movement of the mobile device 101 via accelerometer data, etc.), detecting a predefined user gesture, determining that the object 105 is outside of the reach line 109 of the user, and/or determining that the layout of the objects 105-107 matches a layout of other objects including at least one object that the user was previously unable to reach (and are associated with shifting of the contents of the touchscreen display to facilitate one-handed interaction).

FIG. 1D depicts an enlarging of the contents of the touchscreen display 101 to facilitate one-handed interaction, according to one embodiment. Generally, FIG. 1D depicts where the contents of the touchscreen display 103 are scaled (or zoomed) to make the contents of the touchscreen display 103 larger. As shown, therefore, the objects 105-107 have been enlarged on the touchscreen display 103, while object 107 is no longer visible on the touchscreen display 103. Again, the mobile device 101 may enlarge the contents of the touchscreen display 103 based on any number of factors, such as detecting a user action (e.g., identifying the hand 108 via the camera 104, detecting movement of the mobile device 101 via accelerometer data, etc.), detecting a predefined user gesture, determining that the object 105 is outside of the reach line 109 of the user, and/or determining that the layout of the objects 105-107 matches a layout of other objects including at least one object that the user was previously unable to reach.

Figure 2:
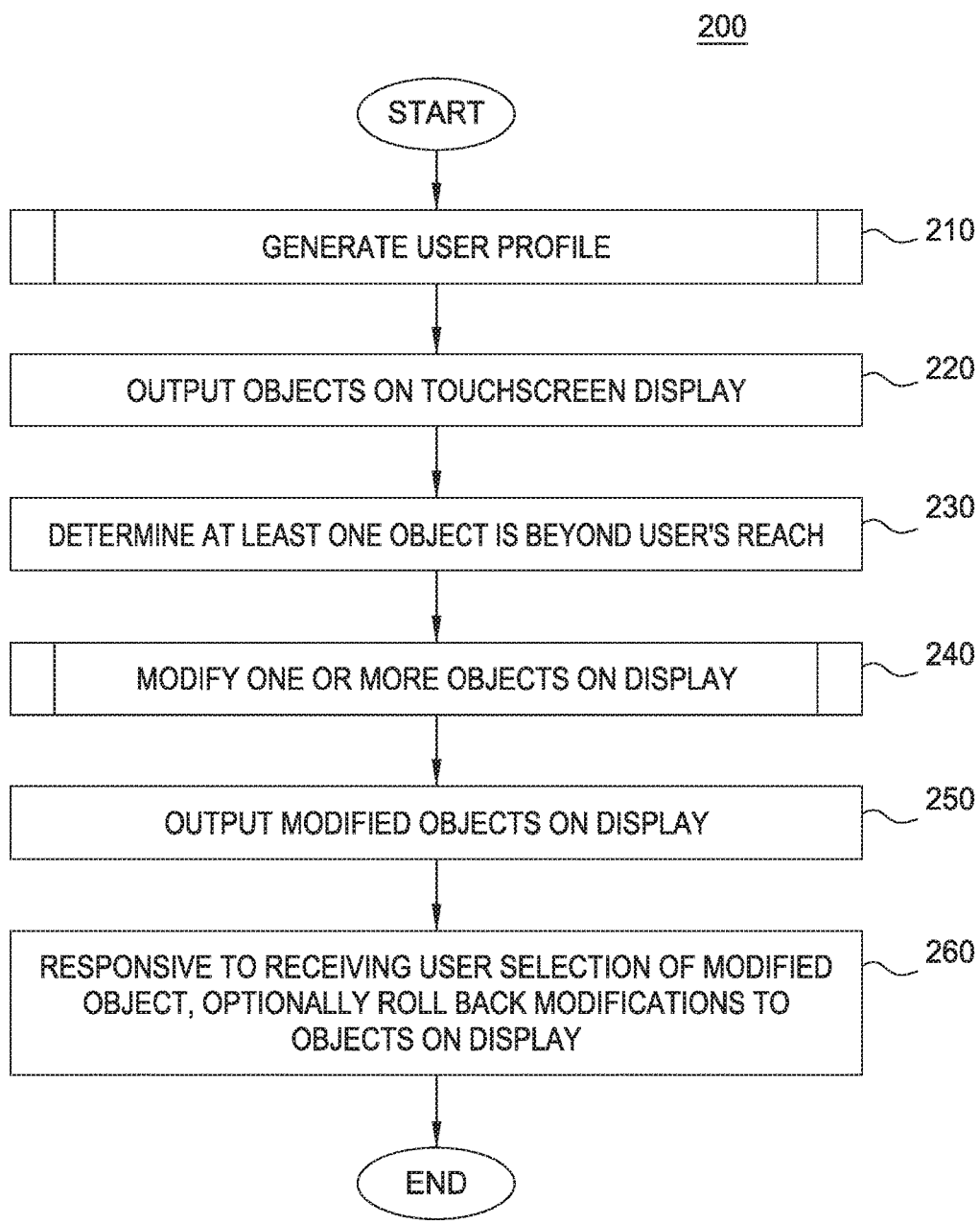
FIG. 2 is a flow chart illustrating a method to modify device content to facilitate user interaction, according to one embodiment.

FIG. 2 is a flow chart illustrating a method 200 to modify mobile device content to facilitate user interaction, according to one embodiment. As shown, the method 200 begins at block 210, where the mobile device 101 generates a user profile for one or more users of the mobile device 101. Generally, in generating the user profile, the mobile device 101 determines the reach span of a user's thumb and defines the reach line 109 for the user. Furthermore, the mobile device 101 may receive user input specifying predefined commands to trigger modification of content on the touchscreen display (such as a spoken command to "modify content on the touchscreen"), and store an indication of the commands in the user profile. Further still, the mobile device 101 may determine user interaction patterns, such as shifting the device in their hand, using a second hand to access content, and the like. The user profile may further include modification operations (e.g., enlarging objects, shifting the display, zooming the entire display, etc.) that are associated with one or more of the types of objects outputted on the display, a layout of the objects outputted on the display, the detected user actions, and the like. Over time, the mobile device 101 continues to refine the user profile based on user interactions with the mobile device.

At block 220, the mobile device 101 outputs one or more objects on the touchscreen display 103. For example, a web browser may load a web page containing a plurality of objects, or a video game may output a plurality of objects for user interaction. At block 230, the mobile device 101 determines that at least one object outputted at block 220 is beyond the range of the user's reach. In at least one embodiment, the mobile device 101 uses data in the user profile defining the range of the user's reach (e.g., the reach line 109) to determine which objects are within or beyond the user's reach. Generally, the mobile device 101 considers the location of each object, and whether the location of each object falls within the reach line 109, or outside the reach line 109 for a given user.

At block 240, described in greater detail with reference to FIG. 4, the mobile device 101 modifies one or more objects on the display. For example, the mobile device 101 may enlarge one or more objects, reduce the size of one or more objects, scale the entire contents of the display, and/or shift the contents of the display. At block 250, the mobile device 101 outputs the modified objects on the touchscreen display 103. At block 260, responsive to receiving user selection of a modified object outputted at block 250, the mobile device may optionally roll back modifications to the objects to return the objects to their normal state. For example, if an image is enlarged and outputted on the display at block 250, the user may select the image for viewing. After the user views the image, the mobile device 101 may remove the modifications of the image, and return the image to its original size.

Figure 3:
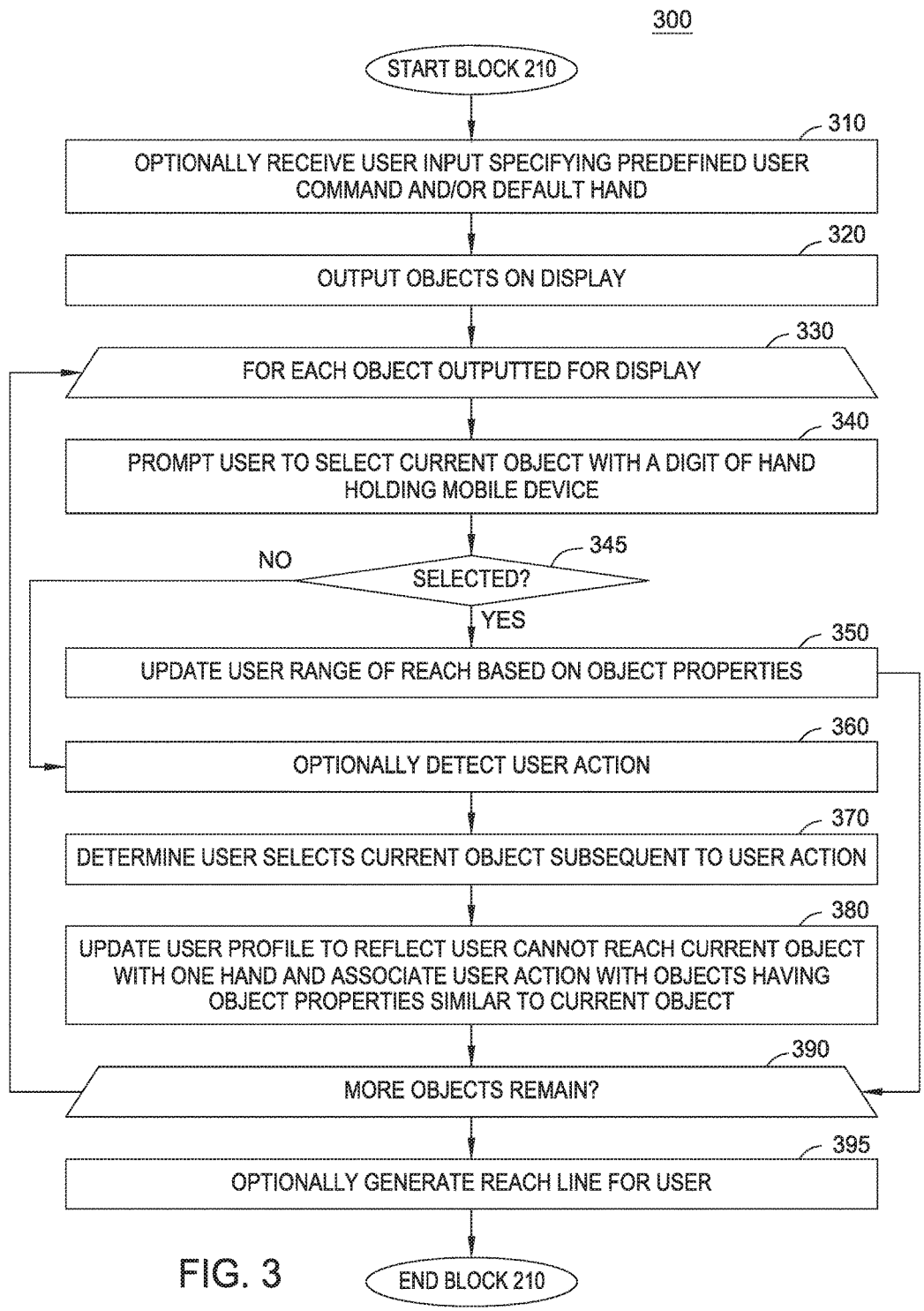
FIG. 3 is a flow chart illustrating an example method to generate a user profile, according to one embodiment.

FIG. 3 is a flow chart illustrating an example method 300 corresponding to block 210 to generate a user profile, according to one embodiment. Generally, the method 300 reflects a training phase where the mobile device 101 discovers information about the user, such as the user's range of reach with a thumb or other digit, user-defined commands to trigger modification of on-screen content, patterns of hand movements, and the like. As shown, the method 300 begins at block 310, where the mobile device 101 optionally receives user input specifying a predefined user command to trigger display modification. The predefined user command may a spoken command, gesture made by the user's hand, and the like. Once received, the mobile device 101 stores the user command in the user's profile. Doing so allows the mobile device 101 to listen for spoken commands and/or hand gestures that match the predefined user command, and trigger modification of the objects displayed on the touchscreen display 103. Additionally, the user input may specify a default hand used by the user in holding the mobile device 101. Doing so allows the mobile device 101 to tailor modification operations according to which hand the user uses to hold the mobile device 101.

At block 320, the mobile device 101 outputs a plurality of objects for display on the touchscreen display 103. Generally, the mobile device 101 places the objects on the touchscreen display 103 to determine whether the user can reach each object. If the user is able to reach a given object, the mobile device 101 stores an indication that the user's range of reach includes the coordinates of the object. Similarly, if the user is unable to reach a given object, the mobile device 101 stores an indication that the user's range of reach does not include the coordinates of the object. At block 330, the mobile device 101 executes a loop including blocks 340-390 for each object outputted for display at block 320. At block 340, the mobile device 101 prompts the user to select the current object with a digit of the hand currently holding the device. For example, the mobile device 101 may highlight the current object, clear other objects from the display, and the like, in order to direct the user to select the current object. At block 345, the mobile device 101 determines whether the user selects the current object. If the user selects the object, the method proceeds to block 350. At block 350, the mobile device updates the user range of reach based on the properties of the current object, having determined that the user is able to select the current object. For example, the mobile device 101 updates the user profile to indicate that the user's range of reach includes the coordinates of the touchscreen display 103 where the current object was displayed. The method may then proceed to block 390.

Returning to block 345, if the user does not select the object, the method proceeds to block 360. In at least one embodiment, the mobile device 101 determines that the user does not select the object based on a timer value exceeding a time threshold. For example, if the time threshold for selecting an object is 5 seconds, and the user does not select the object within 5 seconds, the mobile device 101 may determine that the user has not selected the object. In another embodiment, the mobile device 101 may also output, on the touchscreen display 101, a user-selectable button indicating that the user is not able to reach the object. In at least one embodiment, the mobile device 101 outputs the button within the known range of reach of the user, or towards the middle or bottom of the touchscreen display 103, where the user is most likely to be able to reach. If the user selects this button, the mobile device 101 may determine that the user is not able to select the current object.

At block 360, the mobile device 101 optionally detects a user action. For example, the user action may include the user using their second hand to select the currently displayed object, switching the mobile device 101 from one hand to the other, and/or moving the mobile device 101 within the hand currently holding the mobile device. At block 370, the mobile device 101 may determine that the user has selected the current object subsequent to the user action detected at block 370. For example, the user may shift the mobile device 101 up in their hand, and then select the object currently displayed on the mobile device. At block 380, the mobile device 101 updates the user profile to include an indication that the user cannot reach the current object with one hand. The mobile device 101 may also store an association in the user profile between the user action detected at block 360 and objects having properties similar to the current object. For example, if the user uses a second hand to select the current object, the mobile device 101 may define an association between the user's use of the second hand and objects outputted at or near the location of the touchscreen display where the current object is outputted. The association may also include a layout of the objects outputted on the display at block 320. Doing so allows the mobile device 101 to subsequently identify other similarly formatted layouts, regardless of the application type, and perform a corresponding modification operation to facilitate one-handed interaction with the mobile device.

At block 390, the mobile device 101 determines whether more objects remain for user selection. If more objects remain, the method returns to block 330. If more objects do not remain for user selection, the method proceeds to block 390, where the mobile device optionally generates the reach line 109 for the user. The reach line may be generated based on the screen coordinates of each of the objects outputted at block 320, and whether the user can reach each object or not.

Figure 4:
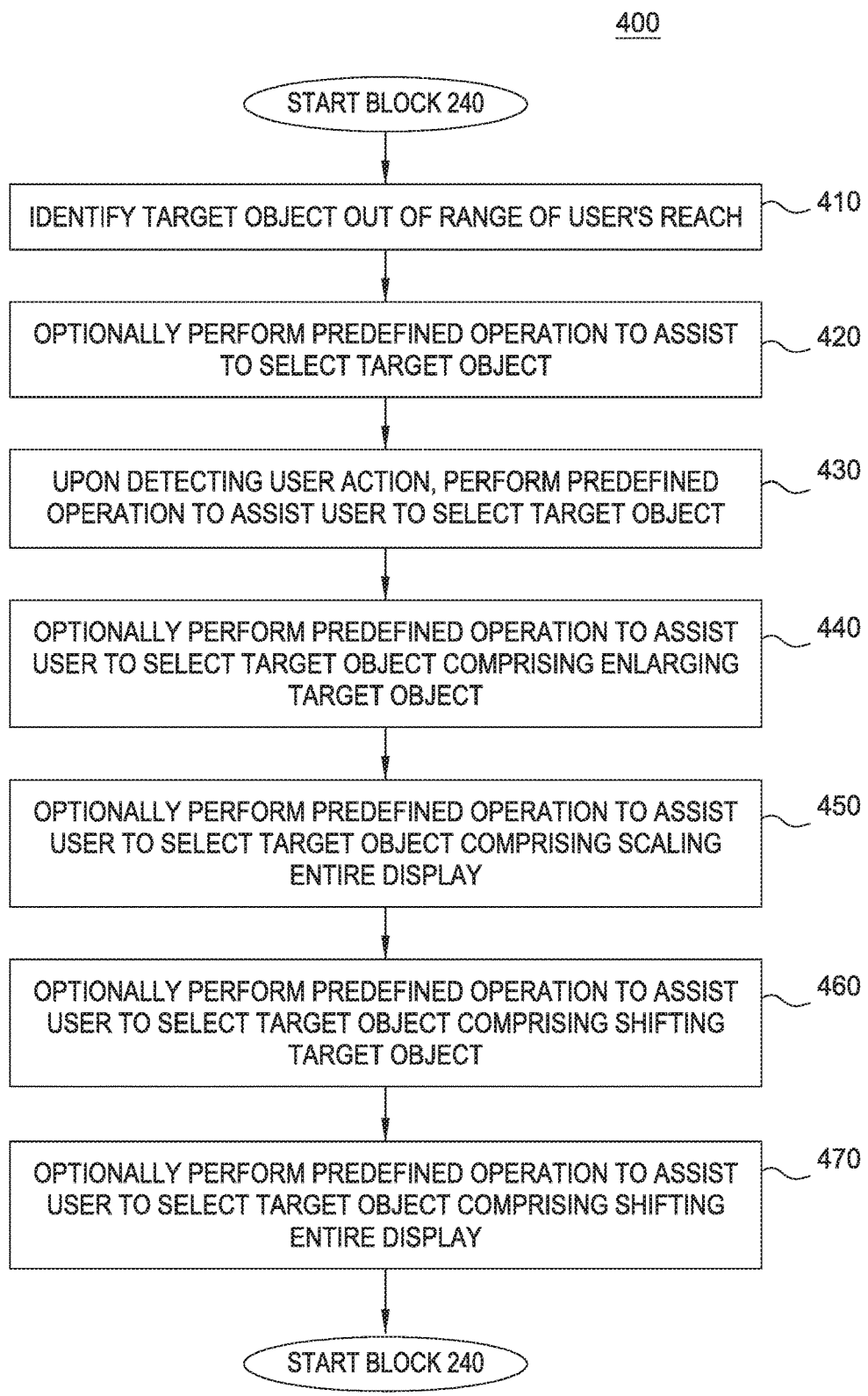
FIG. 4 is a flow chart illustrating an example method to modify content on a display, according to one embodiment.

FIG. 4 is a flow chart illustrating an example method 400 corresponding to block 240 to modify content on a display, according to one embodiment. As shown, the method 400 begins at block 410, where the mobile device 101 identifies one or more target objects of the objects outputted for display at block 220 that are beyond the user's range of reach. In at least one embodiment, the mobile device 101 identifies the target object(s) based on the user's profile, which may include the user's range of reach, and the reach line 109 of the user. If the coordinates of a given object place the target object outside the reach line 109 of the user, the mobile device 101 determines that the object is out of the user's range of reach. Additionally and/or alternatively, the mobile device 101 may compare the layout of objects on the touchscreen device 103 to other layouts stored in the user's profile known to have at least one object that the user cannot reach. If the mobile device 101 identifies a matching layout in the user's profile, the mobile device 101 may identify object(s) in the matching layout marked as not being reachable in the user's profile. The mobile device 101 may then map these object(s) to object(s) currently outputted on the touchscreen display 103, and identify the target object(s) accordingly.

At block 420, the mobile device optionally performs a predefined operation to assist the user to select the target object. For example, if the mobile device 101 determines that the target object is beyond the user's known range of reach, the mobile device 101 may preemptively enlarge the target object to assist the user without requiring the user to move the device, use a second hand, etc., to select the target object. The predefined operation may include one or more of the operations specified in blocks 440-470, as well as any other type of modification operation. At block 430, the mobile device 101 performs a predefined operation to assist the user to select the target object upon detecting a user action. The user action may be any action that indicates the user is attempting to access an object with more than one hand, such as detecting a predefined user command to modify objects (e.g., a spoken or visual cue), identifying the user's other hand with the camera 104, using accelerometer data to determine that the user is moving the mobile device 101, and the like. Therefore, in some embodiments, the mobile device 101 does not preemptively perform the predefined operation to assist the user access the target object with the hand that is holding the mobile device 101. For example, the user may not attempt to access the target object, thereby rendering any assistive operations unnecessary. However, if the mobile device 101 detects the user action, it is more likely that the user is attempting to access an object that is out of reach and needs assistance. As previously indicated, the predefined operation may include one or more of the operations specified in blocks 440-470, as well as any other type of modification operation.

At block 440, the mobile device 101 performs a predefined operation to assist the user to select the target object, the predefined operation comprising enlarging the size of the target object. In enlarging the target object, the mobile device 101 may reduce the size of other objects on the touchscreen display 103, or overlay the enlarged target object over other objects on the touchscreen display 103. At block 450, the mobile device 101 performs a predefined operation to assist the user to select the target object, the predefined operation comprising scaling (enlarging) the entire display. Doing so enlarges each object outputted on the display, which, while likely making some objects not accessible, brings the target object within the user's range of reach. At block 460, the mobile device 101 performs a predefined operation to assist the user to select the target object, the predefined operation comprising shifting the target object on the touchscreen display 103. In shifting the target object, the mobile device 101 moves the target object from its initial location to a location that is within the user's range of reach. In shifting the target object, the mobile device 101 may shift other objects to accommodate the new location of the shifted target objects, and/or overlay the shifted target objects on top of other objects. At block 470, the mobile device 101 performs a predefined operation to assist the user to select the target object, the predefined operation comprising shifting the entire contents of the display. In at least one embodiment, the mobile device 101 shifts the contents of the display to ensure that the target object is within the user's range of reach, even though some objects may not be displayed based on the direction in which the display contents are shifted.

Figure 5:
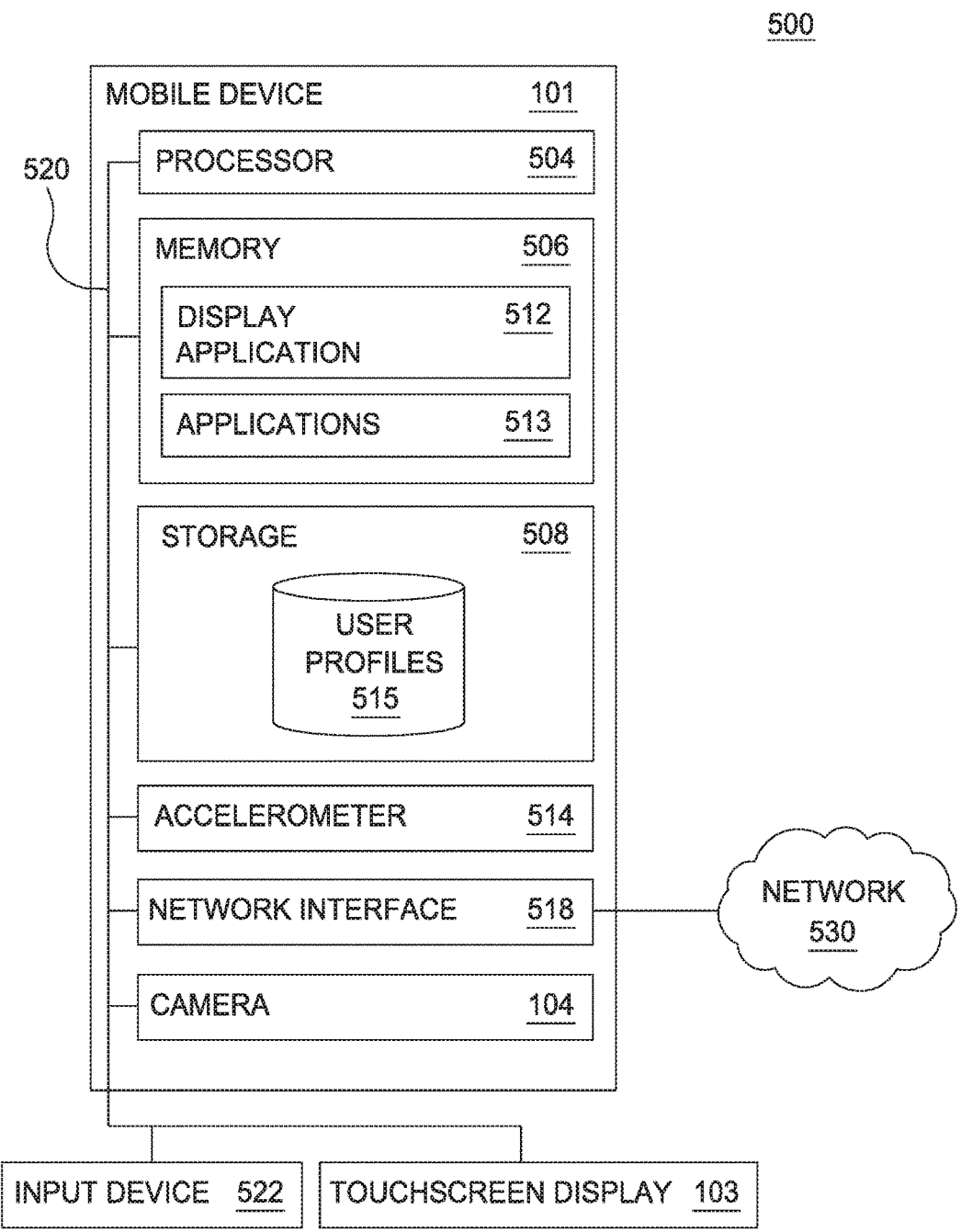
FIG. 5 illustrates an example system including a mobile device which modifies content to facilitate user interaction, according to one embodiment.

FIG. 5 illustrates an example networked system 500 including the mobile device 101 which modifies content to facilitate user interaction, according to one embodiment. The mobile device 101 may also be connected to other computers via a network 530. In general, the network 530 may be a telecommunications network and/or a wide area network (WAN). In a particular embodiment, the network 530 is the Internet.

The mobile device 101 generally includes a processor 504 which obtains instructions and data via a bus 520 from a memory 506 and/or a storage 508. The mobile device 101 may also include the camera 104, an accelerometer 514, one or more network interface devices 518, input devices 522, and output devices 524 connected to the bus 520. The mobile device 101 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the mobile device 101 to communicate with other computers via the network 530.

The storage 508 is representative of hard-disk drives, solid state drives, flash memory devices, optical media and the like. Generally, the storage 508 stores application programs and data for use by the mobile device 101. In addition, the memory 506 and the storage 508 may be considered to include memory physically located elsewhere; for example, on another computer coupled to the mobile device 101 via the bus 520.

The input device 522 may be any device for providing input to the mobile device 101. For example, a keyboard and/or a mouse may be used. The input device 522 represents a wide variety of input devices, including keyboards, mice, controllers, microphones, and so on. Furthermore, the input device 522 may include a set of buttons, switches or other physical device mechanisms for controlling the mobile device 101.

As shown, the memory 506 contains a display application 512 and a plurality of applications 513. The display application 512 is configured to facilitate one-handed user interaction with the mobile device 101 by modifying the output of the touchscreen display 103. The display application 512 is further configured to determine the range of reach of a digit of a user's hand, determine the corresponding reach line 109 for the user, and identify user actions that indicate the user is attempting to use more than one hand to use the mobile device 101. For example, the display application 512 may determine that the reach range of the user's thumb does not extend to cover the entirety of the touchscreen display 103, and generate a reach line 109 accordingly. The display application 512 may subsequently identify an object outputted by an application 513 on the touchscreen display 109 that is outside of the reach range of the user's thumb. In response, the display application 512 may enlarge the object such that it is within the reach line 109 of the user, allowing the user to select the object with a digit of the hand holding the mobile device 101. Additionally and/or alternatively, the display application 512 can detect a user action which indicates the user cannot reach an object on the touchscreen display 103. For example, the display application 512 may determine, based on data from the accelerometer 514, that the user is shifting the mobile device 101 in their hand, or switching the hands which hold the mobile device 101. As another example, the display application 512 may identify, based on analysis of image data provided by the camera 104, a free hand of the user that is not holding the mobile device 101 and is being used to interact with the mobile device 101 (e.g., to hold the mobile device 101, or extending a digit to interact with the touchscreen display 103). In response, the display application 512 may modify one or more objects outputted on the touchscreen display 103. More generally, the display application 512 is configured to implement all functionality described above with reference to FIGS. 1A-4.

As shown, the storage 508 contains the user profiles 515. The user profiles 515 include data generated by the display application 512 indicating which areas of the touchscreen display 103 a given user can reach with a single hand (while also holding the mobile device 101). The user profiles 515 may also include a reach line 109 generated by the display application 512 for each user. The user profiles 515 may also include user actions that indicate the user cannot reach an object on the touchscreen display 103. For example, a first user action for a first user may be a predefined user command defined by the user (e.g., a spoken command, or hand gesture). As another example, a second user action for the first user may be repositioning the mobile device 101 in the user's hand. Additional example user actions include using a second hand to hold the mobile device 101 or select an object on the touchscreen display 103, thereby necessitating two hands to interact with the mobile device 101. As previously indicated, the display application 512 may detect the user actions, and store an indication of a user action the corresponding user profiles.

The user profiles 515 may further include content layouts which include objects that the corresponding user cannot reach. The display application 512 may subsequently compare the layout of the output of the touchscreen display 103 to these known layouts to determine whether the layouts are substantially similar. If the layouts are substantially similar, the display application 512 may further determine that the current output of the touchscreen display 103 includes at least one object that cannot be reached by the associated user. For example, a web browsing application 512 may output a news website that includes a weather widget in the top right-hand corner of the website, which user X cannot reach with one hand. The display application 512 may then store an indication of the layout of the news website and that the user cannot reach the weather widget in user X's user profile 515, which may include position information regarding the location of the weather widget. User X may subsequently visit a second website that includes a stock widget in a position similar to the position of the weather widget of the news website. The display application 512 may compare the layouts of the news website and the second website to determine that the layouts of the websites are the substantially similar, and perform a predefined operation to assist the user to access the stock widget. For example, to bring the stock widget within the range of reach of the user's thumb, the display application 512 may enlarge (e.g., zoom) the second website on the touchscreen display 103, enlarge the stock widget, shift the location of the second website on the touchscreen display 103, and/or shift the location of the stock widget on the touchscreen display 103. Doing so allows the user to select the stock widget with the same hand that is holding the mobile device 101, thereby improving one-handed interaction with the mobile device 101. Similarly, if a video game application 513 has a layout similar to the news website, the display application 512 may modify the output of the video game application 513 to bring an object (e.g., a game menu for the video game) within the reach range 109 of the user on the touchscreen display 103.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the display application 512 could execute on a computing system in the cloud. In such a case, the display application 512 may store user profiles 515 for a plurality of users at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   generating a first user hand position profile for a user by:
      outputting a plurality of objects on a touchscreen display, wherein each of the plurality of objects are outputted at a respective location on the touchscreen display;
      determining that the user can select a first object of the plurality of objects with a digit of a first hand while holding a mobile device with the first hand;
      determining that the user cannot select a second object of the plurality of objects with the digit of the first hand while holding the mobile device with the first hand;
      determining whether the user can select a remaining plurality of objects with the digit of the first hand while holding the mobile device with the first hand;
      storing, in the first user hand position profile for the user, an indication that a range of reach of the digit includes a location of the first object of the plurality of objects and a respective location of each of the remaining plurality of objects the user is determined to be able to select;
      storing, in the first user hand position profile for the user, an indication that the range of reach of the digit does not include a location of the second object of the plurality of objects and the respective locations of each of the remaining plurality of objects the user is determined to not be able to select; and
      generating a reach line for the user based on the locations of the plurality of objects, wherein the reach line reflects the range of reach of the digit;
   dynamically selecting the first user hand position profile, where in the first user hand position profile includes the range of reach of the digit of the first hand of the user while the user is holding the mobile device with the first hand in a first position;
   performing a first predefined operation to modify the second object, wherein modifying the second object causes the second object to be outputted at a location on the touchscreen display within the range of reach of the digit of the first hand; and
   outputting the modified second object on the touchscreen display.

2. The method of claim 1, further comprising:
   detecting a first user action;
   determining that the first user action causes the user to hold the mobile device with the first hand in a second position;
   determining, based on the first user hand position profile, that the location of the modified second object is beyond the range of reach of the digit of the first hand of the user when the mobile device is held with the first hand in the second position;
   performing a second predefined operation to modify the second object to cause the second object to be outputted at a new location on the touchscreen display within the range of reach of the digit of the first hand; and
   outputting the modified second object at the new location on the touchscreen display.

3. The method of claim 2, wherein second predefined operation is further performed based on one or more of: (i) detecting a user-defined spoken command, (ii) detecting, based on image data provided by a camera, a user-defined hand gesture, (iii) identifying, based on the image data provided by the camera, a second hand of the user attempting to interact with the mobile device, (iv) determining, based on movement data provided by an accelerometer, that the user is moving the mobile device in the first hand, and (v) determining, based on the movement data provided by the accelerometer, that the user is moving the mobile device from the first hand to the second hand.

4. The method of claim 1, wherein the first predefined operation comprises one or more of: (i) enlarging the second object, (ii) enlarging each object outputted on the touchscreen display, (iii) moving the second object from a different location to the location, and (iv) moving each object outputted on the touchscreen display.

5. The method of claim 1, further comprising:
   determining a first layout of a first plurality of objects including the unmodified first second object outputted on the touchscreen display;
   determining that the first layout matches a second layout corresponding to a second plurality of objects including a third object;
   determining, based on the first user hand position profile of the user, that a location of the third object of the second plurality of objects is beyond the range of reach of the digit; and
   determining that the location of the third object corresponds to the location on the touchscreen display.

6. The method of claim 5, wherein the first predefined operation is further performed upon determining the first layout matches the second layout and determining that the location of the third object corresponds to the location on the touchscreen display.

7. A computer program product, comprising:
a computer-readable storage medium having computer readable program code embodied therewith, the computer readable program code executable by a processor to perform an operation comprising:
generating a first user hand position profile for a user by:
outputting a plurality of objects on a touchscreen display, wherein each of the plurality of objects are outputted at a respective location on the touchscreen display;
determining that the user can select a first object of the plurality of objects with a digit of a first hand while holding a mobile device with the first hand;
determining that the user cannot select a second object of the plurality of objects with the digit of the first hand while holding the mobile device with the first hand;
determining whether the user can select a remaining plurality of objects with the digit of the first hand while holding the mobile device with the first hand;
storing, in the first user hand position profile for the user, an indication that a range of reach of the digit includes a location of the first object of the plurality of objects and a respective location of each of the remaining plurality of objects the user is determined to be able to select;
storing, in the first user hand position profile for the user, an indication that the range of reach of the digit does not include a location of the second object of the plurality of objects and the respective locations of each of the remaining plurality of objects the user is determined to not be able to select; and
generating a reach line for the user based on the locations of the plurality of objects, wherein the reach line reflects the range of reach of the digit;
dynamically selecting the first user hand position profile, where in the first user hand position profile includes the range of reach of the digit of the first hand of the user while the user is holding the mobile device with the first hand in a first position;
performing a first predefined operation to modify the second object, wherein modifying the second object causes the second object to be outputted at a location on the touchscreen display within the range of reach of the digit of the first hand; and
outputting the modified second object on the touchscreen display.

8. The computer program product of claim 7, the operation further comprising:
detecting a first user action;
determining that the first user action causes the user to hold the mobile device with the first hand in a second position;
determining, based on the first user hand position profile, that the location of the modified second object is beyond the range of reach of the digit of the first hand of the user when the mobile device is held with the first hand in the second position;
performing a second predefined operation to modify the second object to cause the second object to be outputted at a new location on the touchscreen display within the range of reach of the digit of the first hand; and
outputting the modified second object at the new location on the touchscreen display.

9. The computer program product of claim 8, wherein second predefined operation is further performed based on one or more of: (i) detecting a user-defined spoken command, (ii) detecting, based on image data provided by a camera, a user-defined hand gesture, (iii) identifying, based on the image data provided by the camera, a second hand of the user attempting to interact with the mobile device, (iv) determining, based on movement data provided by an accelerometer, that the user is moving the mobile device in the first hand, and (v) determining, based on the movement data provided by the accelerometer, that the user is moving the mobile device from the first hand to the second hand.

10. The computer program product of claim 7, wherein the first predefined operation comprises one or more of: (i) enlarging the second object, (ii) enlarging each object outputted on the touchscreen display, (iii) moving the second object from a different location to the location, and (iv) moving each object outputted on the touchscreen display.

11. The computer program product of claim 7, the operation further comprising:
determining a first layout of a first plurality of objects including the unmodified first second object outputted on the touchscreen display;
determining that the first layout matches a second layout corresponding to a second plurality of objects including a third object;
determining, based on the first user hand position profile of the user, that a location of the third object of the second plurality of objects is beyond the range of reach of the digit; and
determining that the location of the third object corresponds to the location on the touchscreen display.

12. The computer program product of claim 11, wherein the first predefined operation is further performed upon determining the first layout matches the second layout and determining that the location of the third object corresponds to the location on the touchscreen display.

13. A mobile device, comprising:
a processor;
a touchscreen display, and
a memory storing one or more instructions which, when executed by the processor, performs an operation comprising:
generating a first user hand position profile for a user by:
outputting a plurality of objects on a touchscreen display, wherein each of the plurality of objects are outputted at a respective location on the touchscreen display;
determining that the user can select a first object of the plurality of objects with a digit of a first hand while holding a mobile device with the first hand;
determining that the user cannot select a second object of the plurality of objects with the digit of the first hand while holding the mobile device with the first hand;
determining whether the user can select a remaining plurality of objects with the digit of the first hand while holding the mobile device with the first hand;
storing, in the first user hand position profile for the user, an indication that a range of reach of the digit includes a location of the first object of the plurality of objects and a respective location of each of the remaining plurality of objects the user is determined to be able to select;

storing, in the first user hand position profile for the user, an indication that the range of reach of the digit does not include a location of the second object of the plurality of objects and the respective locations of each of the remaining plurality of objects the user is determined to not be able to select; and generating a reach line for the user based on the locations of the plurality of objects, wherein the reach line reflects the range of reach of the digit;

dynamically selecting the first user hand position profile, where in the first user hand position profile includes the range of reach of the digit of the first hand of the user while the user is holding the mobile device with the first hand in a first position;

performing a first predefined operation to modify the second object, wherein modifying the second object causes the second object to be outputted at a location on the touchscreen display within the range of reach of the digit of the first hand; and outputting the modified second object on the touchscreen display.

14. The mobile device of claim 13, the operation further comprising:

detecting a first user action;

determining that the first user action causes the user to hold the mobile device with the first hand in a second position;

determining, based on the first user hand position profile, that the location of the modified second object is beyond the range of reach of the digit of the first hand of the user when the mobile device is held with the first hand in the second position;

performing a second predefined operation to modify the second object to cause the second object to be outputted at a new location on the touchscreen display within the range of reach of the digit of the first hand; and outputting the modified second object at the new location on the touchscreen display.

15. The mobile device of claim 14, wherein second predefined operation is further performed based on one or more of: (i) detecting a user-defined spoken command, (ii) detecting, based on image data provided by a camera, a user-defined hand gesture, (iii) identifying, based on the image data provided by the camera, a second hand of the user attempting to interact with the mobile device, (iv) determining, based on movement data provided by an accelerometer, that the user is moving the mobile device in the first hand, and (v) determining, based on the movement data provided by the accelerometer, that the user is moving the mobile device from the first hand to the second hand.

16. The mobile device of claim 13, wherein the first predefined operation comprises one or more of: (i) enlarging the second object, (ii) enlarging each object outputted on the touchscreen display, (iii) moving the second object from a different location to the location, and (iv) moving each object outputted on the touchscreen display.

17. The mobile device of claim 13, the operation further comprising:

determining a first layout of a first plurality of objects including the unmodified second object outputted on the touchscreen display;

determining that the first layout matches a second layout corresponding to a second plurality of objects including a third object;

determining, based on the first user hand position profile of the user, that a location of the third object of the second plurality of objects is beyond the range of reach of the digit; and determining that the location of the third object corresponds to the location on the touchscreen display, wherein the first predefined operation is further performed upon determining the first layout matches the second layout and determining that the location of the third object corresponds to the location on the touchscreen display.

* * * * *